Oct. 21, 1969     A. QUENOT     3,473,751
LINEAR MEASURING INSTRUMENT WITH DRIVEN MEASURING TAPE
Filed July 24, 1967     2 Sheets-Sheet 1

United States Patent Office 3,473,751
Patented Oct. 21, 1969

3,473,751
LINEAR MEASURING INSTRUMENT WITH
DRIVEN MEASURING TAPE
Andre Quenot, Besancon, France, assignor to Quenote
& Cie S.a.r.l., Besancon, France, a French corporation
Filed July 24, 1967, Ser. No. 655,382
Claims priority, application France, Sept. 8, 1966,
75,670
Int. Cl. B65h 17/02
U.S. Cl. 242—67.2                                2 Claims

ABSTRACT OF THE DISCLOSURE

Linear measuring instrument having a motor for winding, unwinding, or both winding and unwinding, the measuring tape. The motor may be mechanical, magnetic, electro-magnetic or electro-mechanical, which is disposed in a handle communicating with the casing of the instrument in which is wound the measuring tape.

---

Already known are linear measuring instruments having measuring tapes. These instruments measure either one, two or three meters, or one, or several or a fraction of a ten meter dimension. In most of them, the withdrawal of the measuring tape from the casing is effected by the user who pulls on the tape. To rewind the tape inside its casing various processes are employed.

In most, the return of the tape is made manually, but there exists linear measuring instruments comprising a return spring which ensures the automatic rewinding of the tape in the casing. However, in the case of a tape having a length at least equal to two meters, the re-entry speed of the tape may become excessive and this requires the addition of a regulating mechanism producing a progressive braking.

Moreover, these winding mechanisms increase considerably the weight of the device and its volume which has for effect to make them harder to manipulate.

The present invention has for its object to avoid these disadvantages and proposes to furnish a linear measuring instrument comprising a driving device for the tape measure which is independent of the length and which permits to the user to withdraw or return automatically the tape.

To this effect, the invention is concerned with a linear measuring instrument characterized in that it comprises automatic driving means for the tape measure in at least one direction of said tape, said means comprising at least one motor.

The invention will be better understood by referring to the following description made by way of non-limiting example and to the accompanying drawings in which.

Figure 1:
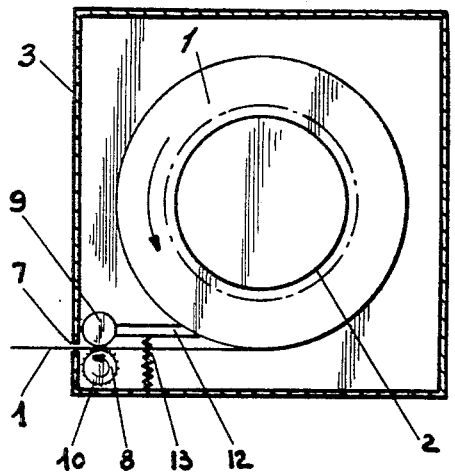
FIGURE 1 represents schematically the principle of operation of a device in accord with the invention.
Figure 2:
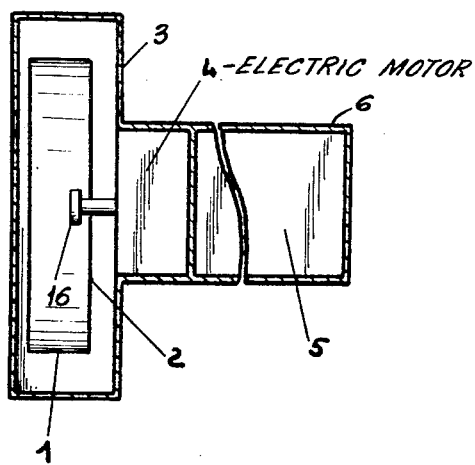
FIGURE 2 shows a side view of the casing according to the invention.

Reference is first made to FIGURES 1 and 2.

The measuring instrument comprises a measuring tape 1 wound on a drum 2 mounted in a casing 3. In order to ensure the driving of tape 1, there is mounted in a handle 6, a motor 4 driven by a source of energy 5. It will be understood that the driving mechanism can be placed in any manner whatever, such as laterally or otherwise.

In casing 3, near outlet 7 for the tape, are mounted two rollers 8 and 9 rotatable around their axis. Roller 8 carries projections 10 which fit in perforations of the tape. Roller 9, for example of rubber, can be mounted on a movable arm 12 and is maintained in contact with roller 8 by spring 13.

In a modification, the two rollers 8 and 9 can for example be rubber-covered and act on the tape simply by friction.

The casing also can have a device for blocking the tape which acts, for example, on rollers 8 and 9.

The motor 4 by means of suitable gears or friction coupling means 16 as schematically shown in FIG. 2 can drive either the drum 2 in one direction in order to permit the winding of the tape or roller 8, for example, in the same direction which occasions the unwinding and withdrawal of the tape. The rewinding and the exit of the tape will thus occur with a constant speed.

An intermediate position of the movable gear permits the auxiliary manual operation of drum 2.

Figure 3:
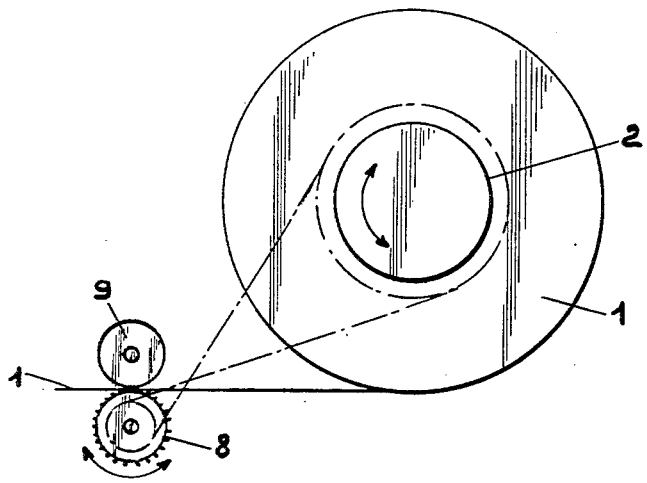
FIGURE 3 shows the principle of operation of a modification of the invention.

Reference is now made to FIGURE 3.

In another modification, drum 2 and rollers 8 and 9 are still driven for winding as well as for the unwinding by a pivoted motor, for example. The link between the two rollers 8 and 9 and drum 2 must be loose to allow a certain slippage between the roller or rollers and drum 2.

Figure 4:
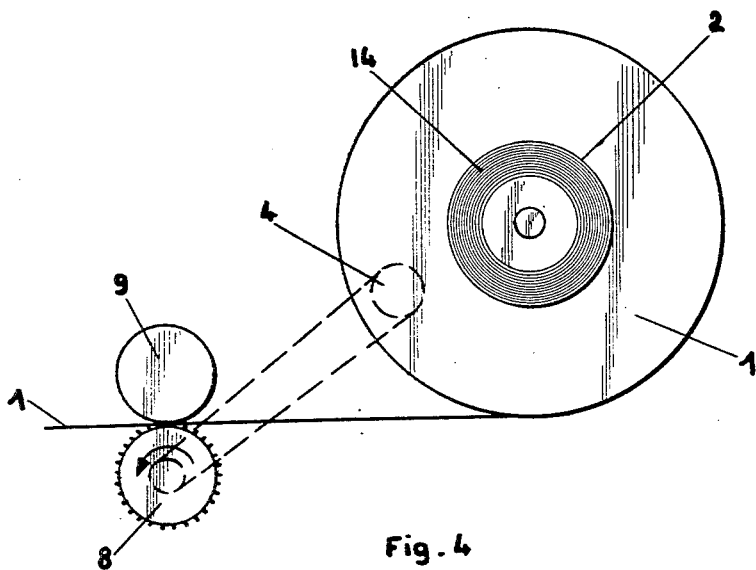
FIGURE 4 shows the principle of operation of a second modification of the invention.

Reference is now made to FIGURE 4.

In a modification of the invention, the return spring of the tape can be kept and roller 8 alone will be driven by a motor which will have to overcome the return force of the spring in order to enable the tape to come out. During the emergence of the tape under the urging of the motor, the return spring will always ensure the maintenance in perfect winding condition of the part of the tape measure 14 remaining on the drum. As before, the emergence of the tape will thus take place at a constant speed. The rewinding of the tape takes place by means of the return spring and can be adjusted by the rollers in unison with the motor thus giving to the tape a constant re-entry speed in the casing. Alternatively, the motor can be uncoupled from roller 8 and the tape enters into the casing as in conventional systems, under the urging of the return spring.

Figure 5:
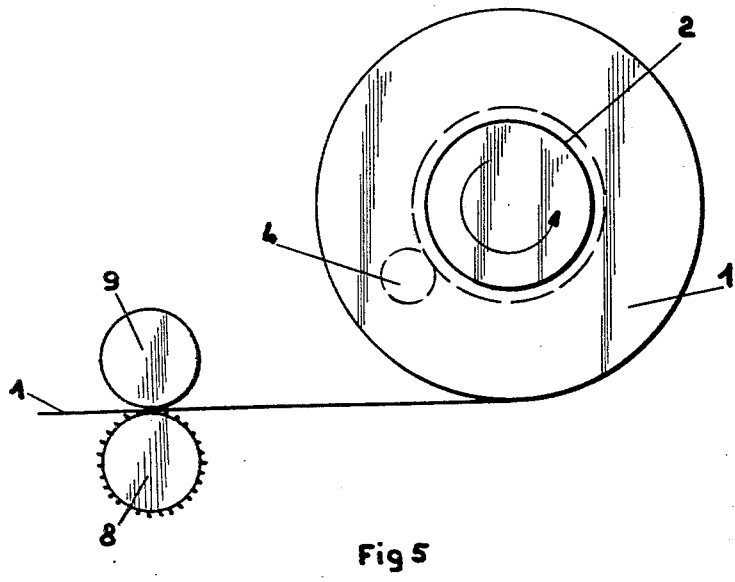
FIGURE 5 shows the operating principle of a third modification of the invention.

Reference is now made to FIGURE 5.

In another modification of the invention, the motor 4 drives only drum 2 to wind the tape. A manual control for the winding drum permits to take the place of the automatic winding if the latter fails. To withdraw the tape, the same must be pulled out after having unclutched the motor from the drum.

The present device can be moulded from plastic, for example, polystyrene or polyethylene, so as to have the handle thereof integral with the casing itself.

Although the invention has been described with respect to one particular embodiment thereof, it is understood that the same is in no way limited thereto and that there can be brought various modifications without departing from the frame and scope of the invention.

What is claimed is:
1. In a linear measuring instrument, a casing, a hollow handle communicating therewith, a winding drum rotatably mounted in said casing, a tape with perforations therein wound on said drum, an outlet in said casing for said tape, a pair of rollers mounted in said casing near said outlet, and on either side of said tape, at least one of said rollers having projections on the periphery thereof for engaging said perforations and thereby positively drive said tape, electric motor means in said handle, for driving said one roller, and means loosely intercoupling said roller and said drum for enabling driving said drum with at least some slippage with respect to said roller.

2. Instrument according to claim 1, having spring means urging said rollers together.

References Cited

UNITED STATES PATENTS

| | | |
|---|---|---|
| 2,222,588 | 11/1940 | Williams. |
| 2,896,875 | 7/1959 | Reed et al. _____ 242—84.1 |
| 2,907,416 | 10/1959 | Comba et al. |
| 3,036,791 | 5/1962 | Siggelkow _____ 242—85 X |
| 3,202,378 | 8/1965 | Williamson _____ 242—84.1 |
| 3,363,666 | 1/1968 | Hodgson et al. ____ 242—67.1 X |
| 3,364,580 | 1/1968 | Lucia _____ 242—54 X |

NATHAN L. MINTZ, Primary Examiner

U.S. Cl. X.R.

242—84.8